(12) United States Patent
Gu et al.

(10) Patent No.: US 7,567,376 B2
(45) Date of Patent: Jul. 28, 2009

(54) HIGH POWER FIBER CHIRPED PULSE AMPLIFICATION SYSTEM UTILIZING TELECOM-TYPE COMPONENTS

(75) Inventors: Xinhua Gu, Ann Arbor, MI (US);
Yuzuru Uehara, Ann Arbor, MI (US);
Donald Harter, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 12/171,780

(22) Filed: Jul. 11, 2008

(65) Prior Publication Data

US 2008/0273558 A1    Nov. 6, 2008

Related U.S. Application Data

(62) Division of application No. 11/434,902, filed on May 17, 2006, now Pat. No. 7,440,162, which is a division of application No. 10/606,829, filed on Jun. 27, 2003, now Pat. No. 7,113,327.

(51) Int. Cl.
*H04B 10/17* (2006.01)
*H01S 3/00* (2006.01)

(52) U.S. Cl. ..................... 359/333; 359/341.1
(58) Field of Classification Search ............. 359/333, 359/341.1
See application file for complete search history.

(56) References Cited

U.S. PATENT DOCUMENTS

| 4,941,738 | A | 7/1990 | Olsson |
| 5,175,643 | A | 12/1992 | Andrews |
| 5,268,911 | A | 12/1993 | Young |
| 5,392,308 | A | 2/1995 | Welch et al. |
| 5,400,350 | A | 3/1995 | Galvanauskas |

(Continued)

FOREIGN PATENT DOCUMENTS

EP        352974 A2      1/1990

(Continued)

OTHER PUBLICATIONS

Boskovic et al, all Fibre Diode Pumped Femtosecond Chirped Pulse Amplification System, Electronics Letters, vol. 31, No. 11, p. 877 (1995).

(Continued)

*Primary Examiner*—Eric Bolda
(74) *Attorney, Agent, or Firm*—Sughrue Mion, PLLC

(57) ABSTRACT

A chirped pulse amplifier (CPA) system having a mode-locked laser and a high-speed pulse selector, wherein the pulse selector modulates output pulses based upon an applied modulation voltage. A pulse selector may be an integrated electro-optic modulator, for example a $LiNbO_3$ modulator, or an electro-absorption modulator. Difficulties related to free-space alignment and operational stability of some prior designs are reduced or eliminated. Fiber coupling generally simplifies beam delivery and alignment. Some embodiments include an erbium fiber (or erbium-ytterbium) based CPA system operating at a wavelength of approximately 1550 nanometers. Similar performance can be obtained at other wavelengths, for example a 1.06 .micrometer Yb-doped fiber system. Moreover, high amplification and peak intensity at the output may be achieved while avoiding non-linear effects in the pulse selector, thereby providing for high intensity picosecond or femtosecond operation.

13 Claims, 10 Drawing Sheets

U.S. PATENT DOCUMENTS

| | | | |
|---|---|---|---|
| 5,592,327 | A | 1/1997 | Gabl et al. |
| 5,818,630 | A | 10/1998 | Fermann et al. |
| 5,847,863 | A | 12/1998 | Galvanauskas et al. |
| 5,867,305 | A | 2/1999 | Waarts et al. |
| 6,181,463 | B1 | 1/2001 | Galvanauskas |
| 6,546,169 | B1 * | 4/2003 | Lin et al. ............... 385/39 |
| 6,567,438 | B2 | 5/2003 | Lin |
| 6,574,250 | B2 | 6/2003 | Sun et al. |
| 6,727,458 | B2 | 4/2004 | Smart |
| 6,738,396 | B2 | 5/2004 | Filgas et al. |
| 7,065,121 | B2 | 6/2006 | Filgas et al. |
| 2002/0167581 | A1 | 11/2002 | Cordingley et al. |
| 2003/0151053 | A1 | 8/2003 | Sun et al. |
| 2003/0156605 | A1 * | 8/2003 | Richardson et al. ........ 372/25 |
| 2004/0240037 | A1 | 12/2004 | Harter |
| 2005/0225846 | A1 * | 10/2005 | Nati et al. ............... 359/341.1 |

FOREIGN PATENT DOCUMENTS

WO    2004107510 A2    12/2004

OTHER PUBLICATIONS

Fermann et al, "High-Power Ultrafast Fiber Laser" Proceedings of SPE, 3942, 194 (2000).

Galvanauskas et al, "13-W Average Power Ultrafast Fiber Laser", Conf. On Lasers and Electro-Optics 2000, San Francisco, CA (May 2000), paper CPD3.

Jaouen et al, "35 kW Subpicosecond Pulse Generation At 1.55 μm Using Er3+/Yb3+ Fiber Amplifier", Conference on Lasers and Electro-Optics (2001), Baltimore Maryland, paper CtuQ3.

* cited by examiner

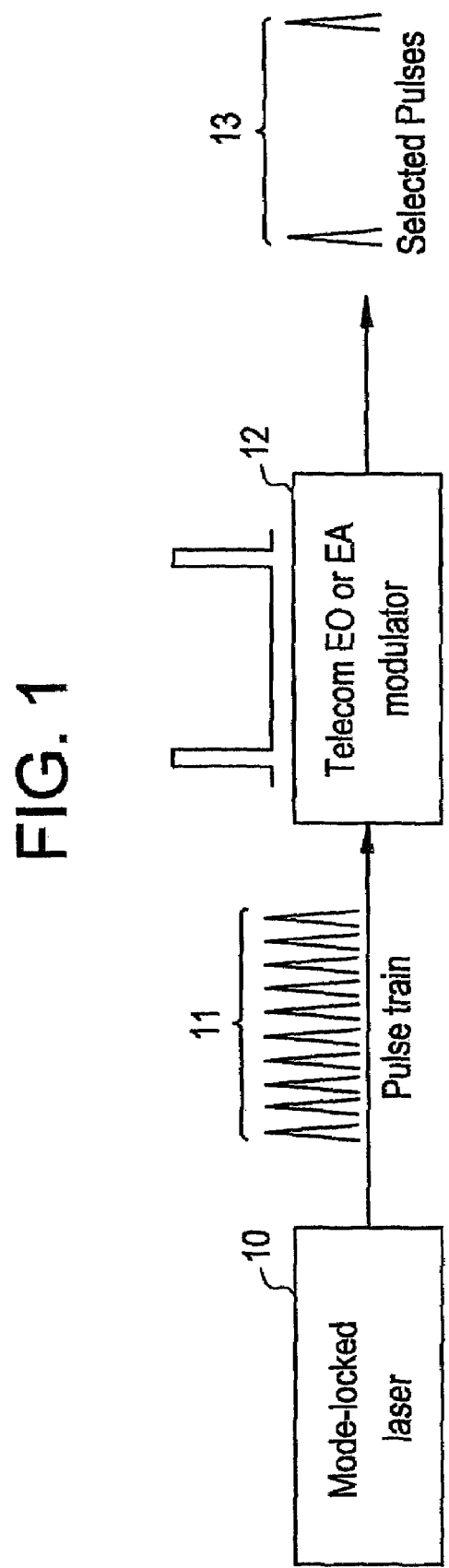

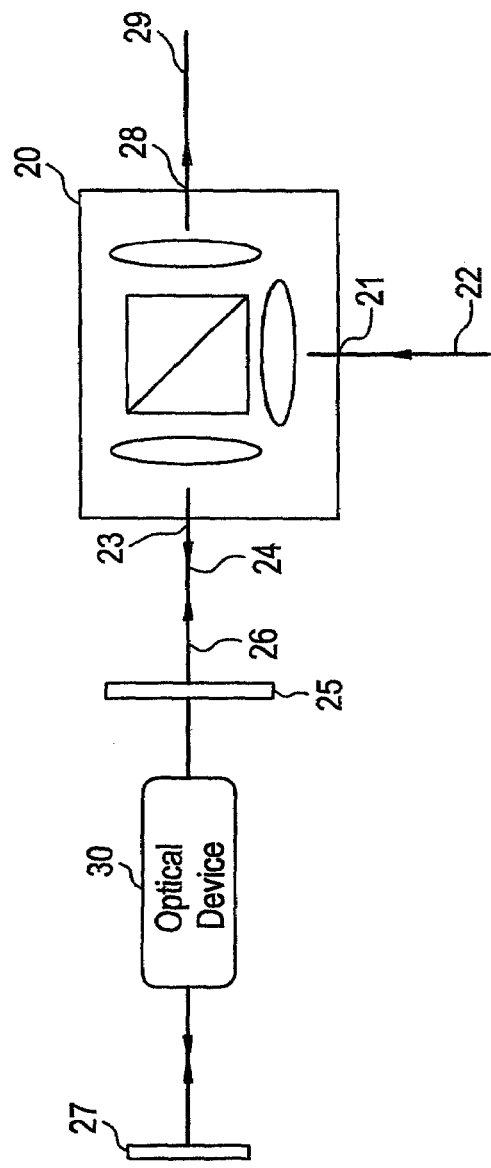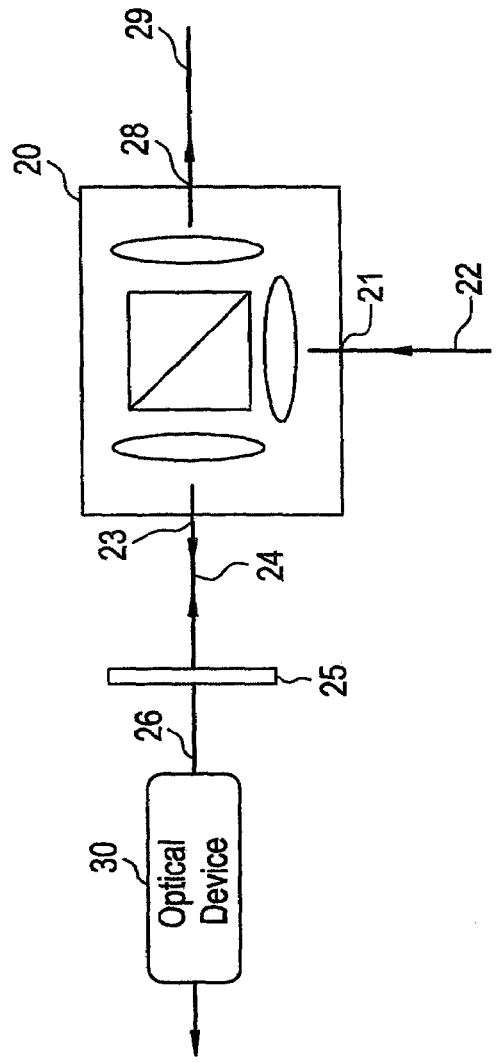

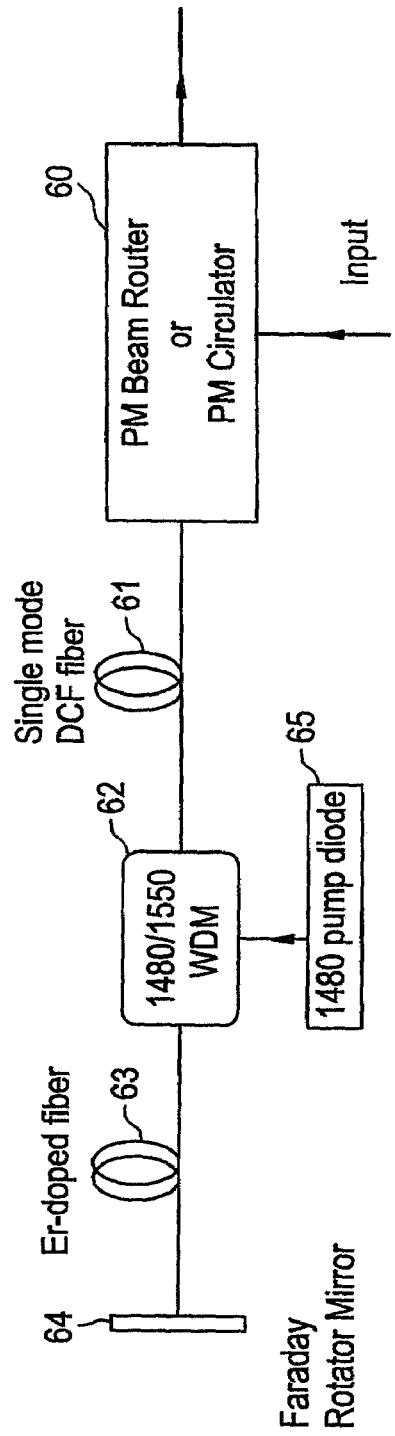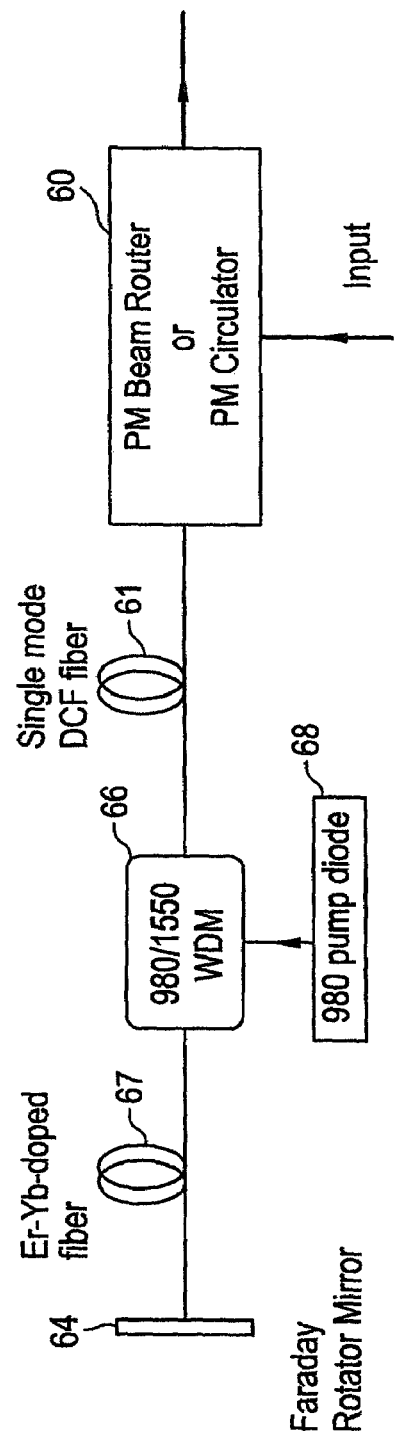

HIGH POWER FIBER CHIRPED PULSE AMPLIFICATION SYSTEM UTILIZING TELECOM-TYPE COMPONENTS

CROSS-REFERENCE TO RELATED APPLICATIONS

This application is a Divisional of application Ser. No. 11/434,902 filed May 17, 2006 now U.S. Pat. No. 7,440,162 which is a Divisional Application of Ser. No. 10/606,829 filed on Jun. 27, 2003 now U.S. Pat. No. 7,113,327.

BACKGROUND OF THE INVENTION

1. Technical Field of the Invention

The present invention relates to the chirped pulse amplification of an ultrashort optical pulse, and more specifically, to chirped pulse amplification using commercial telecommunications components, such as a $LiNbO_3$ modulator for a pulse selector. The present invention further relates to techniques for integration of components together to avoid free space alignment, which results in a more simple assembly process and improved mechanical stability.

2. Description of the Related Art

The following references provide useful background information on the indicated topics, all of which relate to the invention, and are incorporated herein by reference:

A. Galvanauskas and M. E. Fermann, 13-W *Average Power Ultrafast Fiber Laser*, Conference on Lasers and Electro-Optics 2000, San Francisco, Calif., May 7-12, 2000, post deadline paper CPD3.

Y. Jaouen, M. Le Flohic, E. Olmedo and G. KUlsear, 35 *kW Subpicosecond Pulse Generation At* 1.55 *um Using Er*3+/ *Yb*3+ *Fiber Amplifier*, Conference on Lasers and Electro-Optics 2001, Baltimore, Md., May 6-11, 2001, paper CTuQ3.

M. E. Fermann, M. L. Stock, A. Galvanauskas and D. J. Harter, *HighPower Ultrafast Fiber Laser*, Proceedings of SPIE, 3942, 194 (2000).

A. Boskovic, M. J. Guy, S. V. Chemikov, J. R. Taylor, and R. Kashyap, *All-Fibre Diode Pumped Femtosecond Chirped Pulse Amplification System*, Electronics Letters, 31 (11), 877 (1995).

With the increasing interest in high-pulse energy femtosecond lasers in applications such micro-structuring, the emergence of high power high pulse energy fiber lasers has been one of the most exciting developments in optical technology in recent years. Both Galvanauskas et al. and M. E. Fermann et al. have disclosed the achievement of microjoule levels of pulse energy in erbium and ytterbium-based chirped pulse amplification systems. However, at wavelengths of approximately 1550 nanometers, very little research has occurred recently. Researchers in the United Kingdom and France have done some work in this area, but at limited pulse energies. Jaouen et al. have used a peak power of 35 kilowatts and a pulsewidth of 450 femtoseconds, but the pulse energy was only 16 nanojoules. Boskovic et al. only obtained 1.6 nanojoules after amplification without down-counting the repetition rate from the source laser.

In most chirped pulse amplification systems, an acousto-optic (AO) modulator is used to select the pulses to be amplified. However, at wavelengths around 1550 nanometers, such an acousto-optic modulator is not readily available due to material limitations, especially when the original pulse repetition rate is higher than 20 megahertz. For example, if a mode-locked laser source with a pulse repetition rate of 50 megahertz is used, in order to select a pulse from the initial pulse train, less than 10 nanoseconds in rise time and fall time is normally required. However, at such a speed, acousto-optic modulators working at 1550 nanometers are either not readily available or very expensive. In addition, such modulators have high insertion losses. For example, Brimrose manufactures an AO modulator with acceptable performance at 1550 nanometers, but each modulator costs several thousand dollars. Such high costs can limit mass production of amplification systems using such AO modulators.

On the other hand, at 1550 nanometers, high speed electro-optic (EO) modulators (such as $LiNbO_3$) working at 2.5 GHz/s and above (2.5 GHz/s, 10 GHz/s, even 40 GHz/s) are readily available and relatively cheap, due to the large inventory available in the telecommunications industry. A fiber pigtailed 2.5 GHz/s $LiNbO_3$ modulator can be purchased for less than a thousand dollars. No chirped pulse amplification system, however, has ever used such an electro-optic modulator system.

A $LiNbO_3$ electro-optic modulator is a type of Mach-Zehnder modulator. A $LiNbO_3$ modulator comprises an integrated optical waveguide on a material that can exhibit electro-optic effects. Electro-optic materials have an index of refraction that can be changed with the application of voltage. Mach-Zehnder modulators operate using interferometry techniques. The optical signal is branched into two separate paths and is then recombined at the output. The two paths of the interferometer are nearly, but not exactly, the same length. When the two optical signals from the two paths are combined at the output, the two signals will have a slightly different phase. If these two signals are exactly in phase, then the light will combine in the output waveguide with low loss. However, if the two signals are 180° out of phase, the light will not propagate in the output waveguide and as a result, it will radiate into the surrounding substrate. The electro-optic effect makes the velocity of propagation in each path dependent on the voltage applied to the electrode. As a result, depending on the modulation voltage, the light will propagate with high or low loss at the output waveguide.

Commercial telecommunications modulators all have fiber pigtails aligned to the input and output waveguides. The input fiber pigtail has to be a polarization-maintaining fiber, since Mach-Zehnder modulators must have a specific input polarization state to function properly, But the output fiber pigtail can be either polarization-maintaining or non-polarization-maintaining fiber, depending on the application.

In a typical chirped pulse amplification system, a stretcher and one or two pre-amplifiers are needed, as well as the pulse selector before the power amplifier. The stretcher can be a bulk grating or fiber grating, or a fiber stretcher, as discussed in U.S. Pat. No. 5,847,863 issued to Galvanauskas et al., and hereby incorporated by reference in its entirety. However, even if a fiber-based device was used as stretcher, it was heretofore assembled using free space alignment, wherein a coupling element (e.g, a lens) coupled the input pulse into the fiber. Although technically sufficient, the coupling element is not suited to mass production, due to the labor-intensive assembly involved. In addition, the long-term operational stability of the system is usually an issue as well. For example, the coupling has to be frequently adjusted to ensure high throughput.

An erbium-doped fiber amplifier is a common active device, which uses a certain length of erbium-doped fiber and a pump diode (operating at either 980 nanometers or 1480 nanometers). Due to the non-polarizationmaintaining nature of the erbium-doped fiber, a double pass configuration has to be used to maintain the polarization. Due to the polarization sensitive nature of the 1200)₃ modulator, it can not be used in the same double pass loop with other non-polarization-maintaining fiber components.

Normally, $LiNb_3$ modulator has a low extinction ratio (~23 decibels), which results in a low signal/noise contrast ratio, typically around 20-23 decibels. This low signal/noise contrast ratio is inadequate for a chirped pulse amplification system, and has to be increased to at least 30 decibels, or higher. In order to achieve this, either the polarization extinction ratio of the modulator must be improved, or other methods have to be exploited to increase the signal/noise contrast ratio.

SUMMARY OF THE INVENTION

The invention has been made in view of the above circumstances and to overcome the above problems and limitations of the prior art, and provides an erbium fiber (or erbium-ytterbium) based chirped pulse amplification system operating at a wavelength of approximately 1550 nanometers. The use of fiber amplifiers operating in the telecommunications window enables the implementation of telecommunications components and telecommunications compatible assembly procedures with superior mechanical stability.

Additional aspects and advantages of the invention will be set forth in part in the description that follows and in part will be obvious from the description, or may be learned by practice of the invention. The aspects and advantages of the invention may be realized and attained by means of the instrumentalities and combinations particularly pointed out in the appended claims.

The above and other aspects and advantages of the invention will become apparent from the following detailed description and with reference to the accompanying drawing figures.

All technical articles, patents and patent applications referenced herein are here by incorporated by reference as if bodily contained herein.

BRIEF DESCRIPTION OF THE DRAWINGS

The accompanying drawings, which are incorporated in and constitute a part of this specification illustrate embodiments of the invention and, together with the description, serve to explain the aspects, advantages and principles of the invention. In the drawings, FIG. 1 illustrates a $LiNbO_3$ modulator being used as a pulse selector on the output from a mode-locked laser;

FIGS. 2a and 2b illustrate beam propagation and polarization in the polarization-maintaining beam router, according to the present invention;

FIGS. 5a and 5b illustrate a double pass pulse stretcher cascaded with an erbium doped fiber amplifier, according to the present invention;

DESCRIPTION OF THE PREFERRED EMBODIMENTS

Figure 3A:
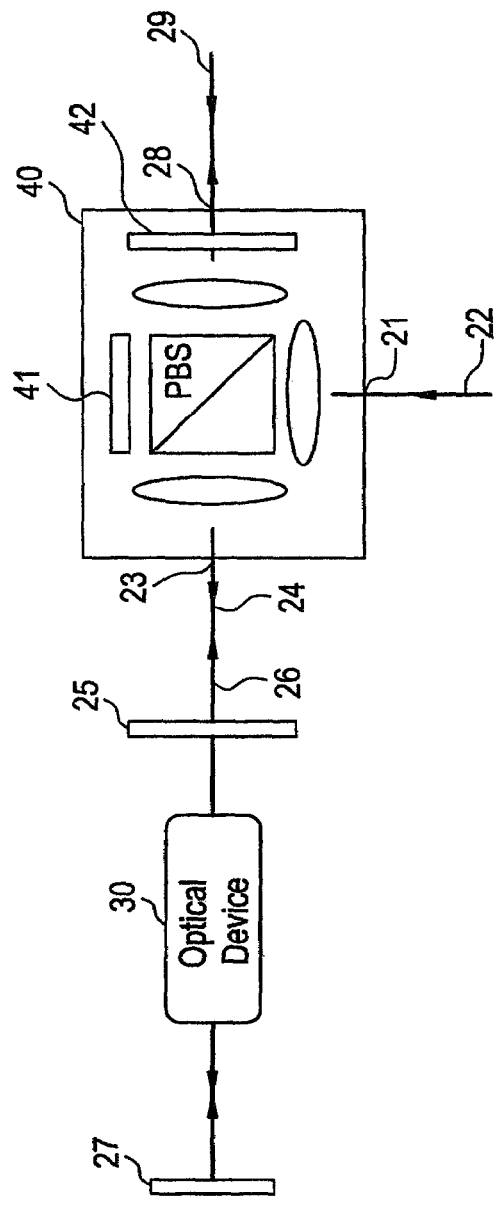
FIGS. 3a and 3b illustrate beam propagation and polarization in the polarization-maintaining circulator, according to the present invention.

A detailed description of the preferred embodiments of the invention will now be given referring to the accompanying drawings.

For chirped pulse amplification systems operating at wavelengths of approximately 1550 nanometers, acousto-optic modulators with fast rise times have limited availability, due to lack of appropriate materials. However, the telecommunications electro-optic modulators and electro-absorption modulators provide an alternative solution. Such modulators, however, have not been used in a chirped pulse amplification system for the purpose of pulse selection. Referring to FIG. 1, a chirped pulse amplification system is illustrated. A mode-locked laser 10 outputs a pulse stream 11, which is input into a modulator 12. The modulator 12 then modulates the incoming pulse stream 11, and outputs the selected pulses 13. The modulator 12 can be a $LiNbO_3$ electro-optic modulator or an electro-absorption modulator.

In the present invention, $LiNbO_3$ modulator is used as a pulse selector. Using a conventional down-counter electronics circuit, a modulator voltage was applied to the $LiNbO_3$ modulator, thereby enabling pulse selection from a 50 megahertz mode-locked laser source to as low as around 100 kilohertz. Both input and output pigtail fibers must be polarization maintaining fiber in order to maintain the polarization states during the pulse selection, since the $LiNbO_3$ modulator is polarization sensitive. A clean pulse train at the corresponding repetition rate can be generated in this manner.

Electro-optic modulators and electro-absorption modulators accumulate nonlinear effects at peak intensity (i.e., approximately 200 Watts), so the pulse is stretched before being injected into the modulator. For a polarization-sensitive modulator like a $LiNbO_3$ modulator, polarizationmaintaining fiber must be used at the input, but the output fiber can be both polarization-maintaining fiber and non-polarization-maintaining fiber. In the preferred embodiment, the polarization in the whole system is maintained, so the output fiber of the modulator is also polarization-maintaining fiber.

Several types of stretchers can be used in a chirped pulse amplification system. Initially, a first pair of bulk gratings are used to stretch the input pulse and then compressed back after amplification by using a second pair of bulk gratings. The second pair of bulk gratings has parameters similar to the first pair of bulk gratings. Alternatively, linear or non-linear fiber gratings or even a length of fiber can serve as pulse stretcher, as long as the fiber or the fiber grating has the right dispersion value.

Preferably, commercially available dispersion compensating fiber or dispersion shifted fiber is used as stretcher fiber, and fairly good performance is obtained. However, since a long length of fiber has to be used, accumulated third order dispersion due to the stretcher fiber is not negligible.

Although second order dispersion from the stretcher fiber can be easily compensated by the compressor grating system, the accumulated third-order dispersion was added together by the compressor grating and the final pulse width is always wider than the initial pulse width from the mode-locked laser. In order to compensate both the second-order and third order dispersion in the system, a nonlinearly chirped fiber grating with matched bandwidth to the mode-locked laser source is more desirable, or a specially designed fiber with proper second- and third-order dispersion which match those in the compressor gratings can be used.

In case of a non-polarization-maintaining fiber stretcher, a double pass configuration has to be used to maintain the polarization. Typically, a combination of a polarization beam splitter cube and a Faraday rotator mirror is used. Conventionally, the source beam from a mode-locked laser or from a pulse selector passes through the polarization beam splitter, and then the output from the polarization beam splitter was coupled into the stretcher via free space. After the double pass and pass through the polarization beam splitter, the stretched pulse was either sent to the pulse selector or to a pre-amplifier.

In order to utilize telecommunications assembly procedures (i.e., integration, fiber splicing) and due to the fiber-based nature of the present invention, a polarization-maintaining beam router and a polarizationmaintaining circulator are used. Basically, the polarization-maintaining beam router and polarization-maintaining circulator operate in the same manner as a free space polarization beam splitter, but with polarization-maintaining fiber. With advances in telecommunications technologies, packaging such a device is a relatively easy task and it can be hermetically sealed if necessary.

By combining a polarization-maintaining beam router or a polarization-maintaining circulator with a Faraday rotator mirror, polarization can be maintained even with non-polarization-maintaining fibers. In addition, conventional telecommunications assembly procedures can be used. As shown in FIGS. 3a, 3b, 4a and 4b, by properly matching the fiber slow axis to the desired beam polarization, system polarization can be maintained with fiber splicing.

For example, a s-polarized beam (relative to the polarization beam splitter) entering a polarization beam splitter at a first port will be directed to a second port. Due to the Faraday rotator minor, the polarization of the reflected beam will rotate by 90°, and can then traverse through the beam splitter and be directed towards a third port. If the pigtailed polarization-maintaining fiber at the third port has the slow axis (or the fast axis depending on the polarization in the next fiber component) aligned to the p-polarized beam, then the polarization of the whole system is maintained after the double pass configuration. A polarization-maintaining circulator can be constructed from the same design, in which a Faraday rotator and a Faraday rotator mirror are added into the packaging and the polarization-maintaining fiber at the third port is oriented at 45° relative to the polarization beam splitter. Using currently available telecommunications fiber-pigtailed components, the front end of a chirped pulse amplification system can be built easily and rigidly. Advantageously, all the components can be connected together by simply splicing them together.

Referring to FIG. 2a, a polarization-maintaining beam router is illustrated. The source pulse enters at the first port 21 of the polarization beam splitter 20. The polarization-maintaining fiber 22 is aligned such that the incoming source pulse will propagate in the polarization-maintaining fiber 22 in an s-polarization state relative to the polarization beam splitter 20. For the polarization-maintaining fiber 22, alignment with either propagation axis is permissible. The incoming source pulse is collimated and directed to the second port 23. The second port 23 is coupled to a second polarization-maintaining fiber 24. For the second polarization-maintaining fiber 24, alignment with either propagation axis is permissible. For example, in a fiber-based device, a non-polarization-maintaining dispersion compensating fiber 26 can be directly spliced to the polarization-maintaining fiber 24 attached to the second port 23. A pigtailed Faraday rotator 25 and a mirror 27 are spliced to the dispersion compensating fiber 26 to create the double pass loop. The optical device 30 coupled between the Faraday rotator 25 and the mirror 27 is transmissive. The Faraday rotator 25 and the mirror 27 cause the collimated input pulse to be reflected back into polarization beam splitter 20, but with the pulse polarization rotated by 90°. Due to the polarization rotation, the input pulse can now transit through the polarization beam splitter 20 and is coupled to the third port 28. Assuming that the input pulse propagates along the slow axis in all the polarization-maintaining fibers, then the polarization-maintaining fiber 29 coupled to the third port 28 has to be aligned such way that the slow axis matches with the p-polarization relative to the polarization beam splitter 20.

Referring to FIG. 2b, an alternative polarization-maintaining beam router is illustrated. The source pulse enters at the first port 21 of the polarization beam splitter 20. The polarization-maintaining fiber 22 is aligned such that the incoming source pulse will propagate in the polarization-maintaining fiber 22 in an s-polarization relative to the polarization beam splitter 20. For the polarization-maintaining fiber 22, alignment with either propagation axis is permissible. The incoming source pulse is collimated and directed to the second port 23. The second port 23 is coupled to a second polarization-maintaining fiber 24 For the second polarization-maintaining fiber 24, alignment with either propagation axis is permissible. In a fiber-based device, a non-polarization-maintaining dispersion compensating fiber 26 can be directly spliced to the polarization-maintaining fiber 24 attached to the second port 23. Different from FIG. 2a, a faraday rotator mirror was used at the end of the loop to create the double pass. The optical device 30, such as a fiber grating (which is a mirror), coupled after the Faraday rotator 25 not is transmissive. The Faraday rotator 25 and the optical device 30 cause the collimated input pulse to be reflected back into polarization beam splitter 20, but with the pulse polarization rotated by 90° Due to the polarization rotation, the input pulse can now transit through the polarization beam splitter 20 and is coupled to the third port 28. Assuming that the input pulse propagates along the slow axis in all the polarization-maintaining fibers, then the polarization-maintaining fiber 29 coupled to the third port 28 has to be aligned such that the slow axis matches with the p-polarization relative to the polarization beam splitter 20.

Referring to FIG. 3a, a polarization-maintaining beam router converted into a polarization-maintaining circulator is illustrated. Using the polarization-maintaining beam router depicted in FIG. 2a, a Faraday rotator mirror 41 and a Faraday rotator 42 are added in the polarization circulator 40, In this embodiment, instead of an optical device 30 having non-transmissive properties, an optical device 30 with transmissive properties is used. Therefore, a Faraday rotator mirror 43 is required. The polarization-maintaining fiber 29 coupled to the third port 28 has to be aligned 45° relative to the polarization beam splitter 40. Assuming a light pulse with s-polarization relative to the polarization beam splitter 40 is input into the first port 21, it is directed to the second port 23 as discussed above. After being reflected back from the second port 23 by the Faraday rotator 25 and the mirror 27, it is coupled into the polarization-maintaining fiber 29 at the third port 28. As discussed above, the slow axis of the polarization-maintaining fiber 29 is coupled to the third port 28. If a light pulse propagating on the slow axis of the polarization-maintaining fiber 29 coupled to the third port 28 is injected back into the polarization circulator 40, the Faraday rotator 42 will rotate the light pulse by 45°. The light pulse will be directed to the Faraday rotator mirror 41 located opposite to the first port 21. After reflecting back from the Faraday rotator mirror 41, it will be directed to the first port 21.

Figure 3B:
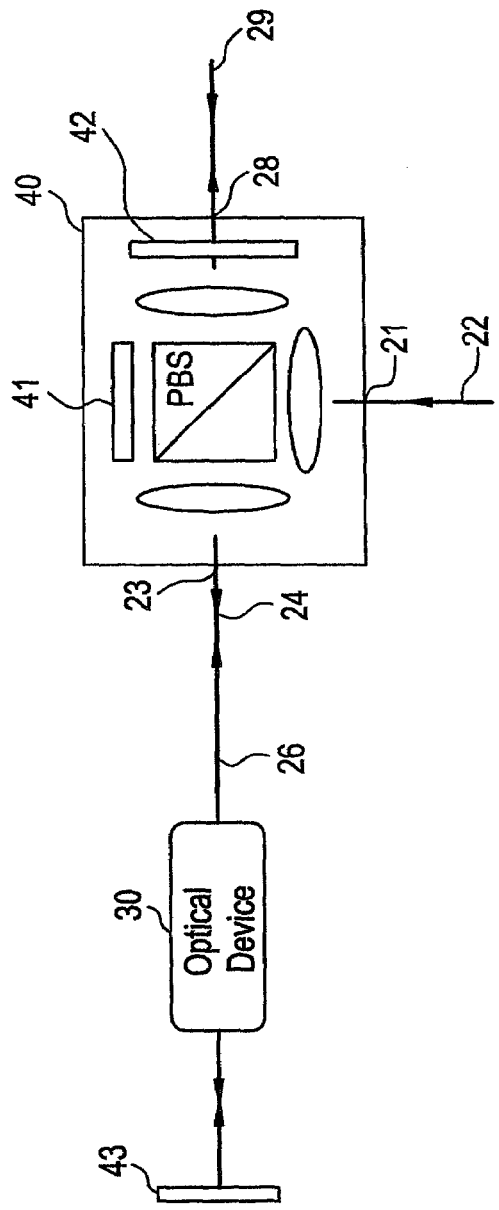

Referring to FIG. 3b, a second polarization-maintaining circulator is illustrated. Using the polarization-maintaining beam router depicted in FIG. 2b, a Faraday rotator mirror 41 and a Faraday rotator 42 are added in the polarization circulator 40. The second polarization-maintaining circulator operates in the same manner as the first polarization-maintaining circulator described above. By using either of the polarization-maintaining beam routers illustrated in FIGS. 2a and 2b, or the polarization-maintaining circulators illustrated in FIGS. 3a and 3b, a double pass configuration system can be built by simply splicing non-polarization-maintaining fibers together.

Figure 4A:
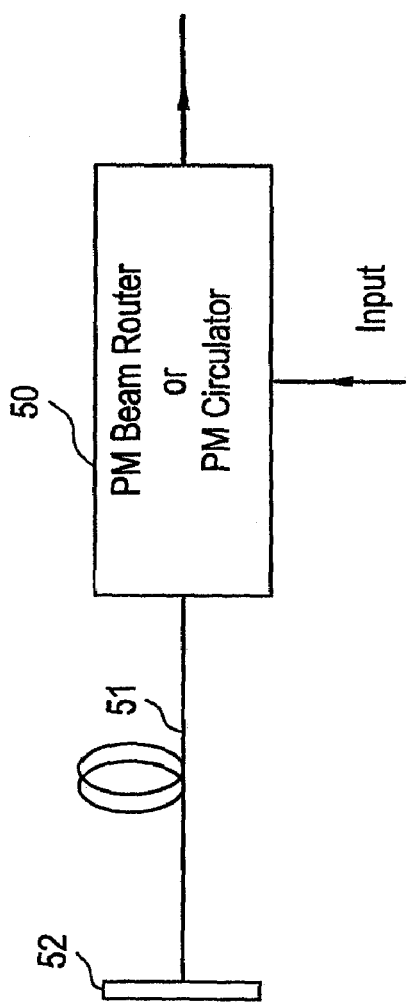
FIGS. 4a and 4b illustrate a double pass stretcher system using the polarization maintaining beam router or the polarization-maintaining circulator and a non-polarization-maintaining dispersion compensating fiber or fiber grating, according to the present invention.

Referring to FIG. 4a, a double pass polarization-maintaining stretcher is depicted. A single mode non-polarization-maintaining dispersion compensating fiber 51 is coupled between a polarization-maintaining beam router 50 and a Faraday rotator mirror 52. A polarization-maintaining circulator can be used instead of the polarization-maintaining beam router.

Figure 4B:
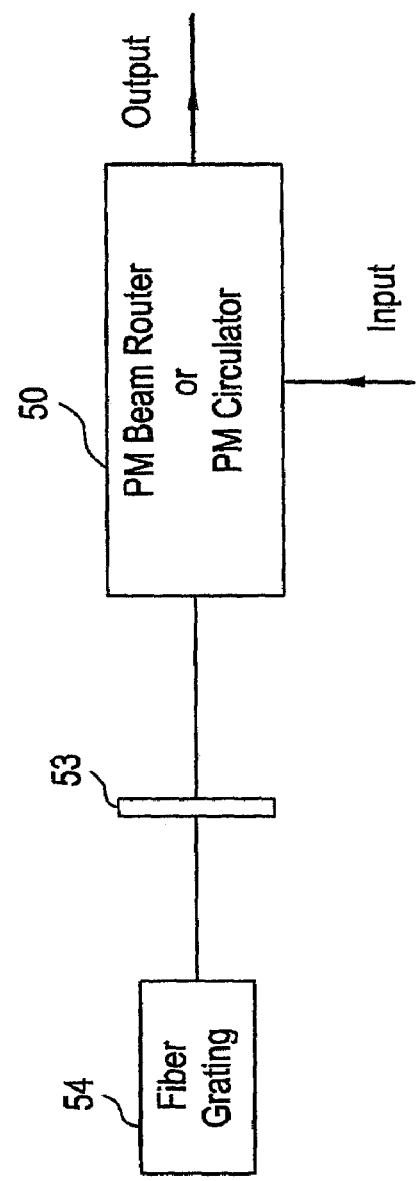

Referring to FIG. 4b, a second double pass polarization-maintaining stretcher is depicted. As with the previous stretcher system, a polarization-maintaining beam router 50 is used, or in the alternative, a polarization-maintaining circulator can be used. Instead of a Faraday rotator mirror, the second double pass polarization-maintaining stretcher uses a Faraday rotator 53 and a non-polarization-maintaining fiber grating 54. The fiber grating 54 can be either linearly or nonlinearly chirped.

Referring to FIG. 5a, a double pass stretcher is cascaded with an erbium-doped fiber amplifier. A polarization-maintaining beam router 60 is coupled to a single mode non-polarization-maintaining dispersion compensating fiber 61, which is then coupled to a 1480/1550 nanometer wavelength division multiplexer 62. A polarization-maintaining beam circulator can be substituted for the polarization-maintaining beam router 60. A 1480 nanometer pump diode 65 is coupled to the 1480/1550 nanometer wavelength division multiplexer 62. An erbium-doped fiber amplifier 63 is coupled between a Faraday rotator mirror 64 and the 1480/1550 nanometer wavelength division multiplexer 62. Referring to FIG. 5b, a second double pass stretcher is cascaded with a ytterbium/erbium doped fiber amplifier. A polarization-maintaining beam router 60 is coupled to a single mode non-polarization-maintaining dispersion compensating fiber 61, which is then coupled to a 980/1550 nanometer wavelength division multiplexer 66. A polarization-maintaining beam circulator can be substituted for the polarization-maintaining beam router 60. A 980 nanometer pump diode 68 is coupled to the 980/1550 nanometer wavelength division multiplexer 66. A ytterbium/erbium fiber amplifier 67 is coupled between a Faraday rotator mirror 64 and the 980/1550 nanometer wavelength division multiplexer 66.

Figure 6:
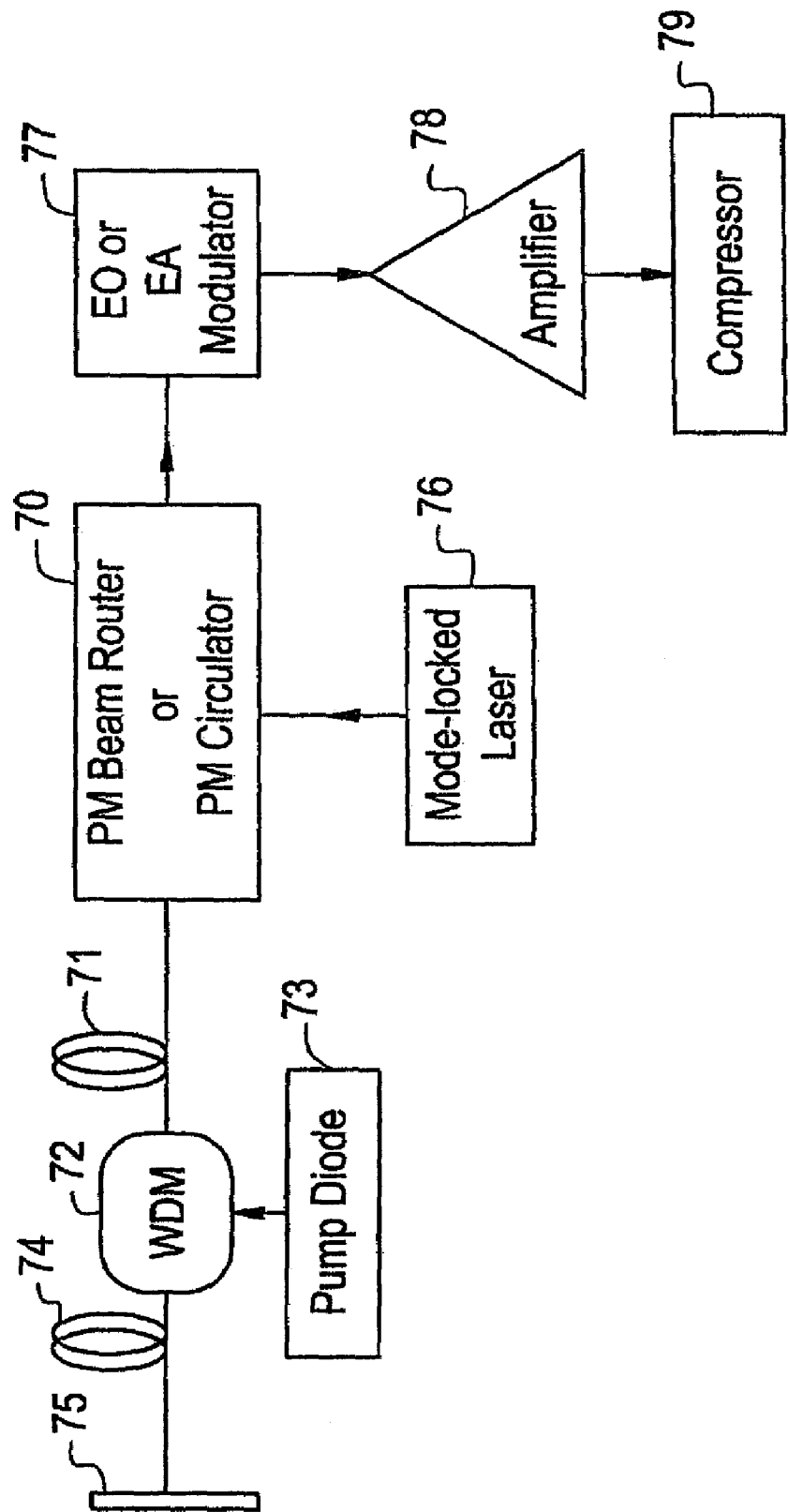
FIG. 6 illustrates a first chirped pulse amplification system using a polarization-maintaining beam router/circulator and a modulator, according to the present invention.

Referring to FIG. 6, a chirped pulse amplification system according to the present invention is depicted, and the amplification system uses a fiber-based polarization-maintaining double pass configuration with non-polarization-maintaining components. A polarization-maintaining beam router 70 is coupled to a single mode non-polarization-maintaining dispersion compensating fiber 71, which is then coupled to a wavelength division multiplexer 72. A pump diode 73 is coupled to the wavelength division multiplexer 72. An amplifier fiber 74 is coupled between a Faraday rotator mirror 75 and the wavelength division multiplexer 72. A mode-locked laser, 76 supplies input pulses to the polarization-maintaining beam router 70. The output pulses from the polarization-maintaining beam router 70 are selected using the earlier described electro-optic modulator 77 as pulse selector. An amplifier 78 amplifies the output pulses, and then a compressor 79 compresses the output pulses.

Figure 7:
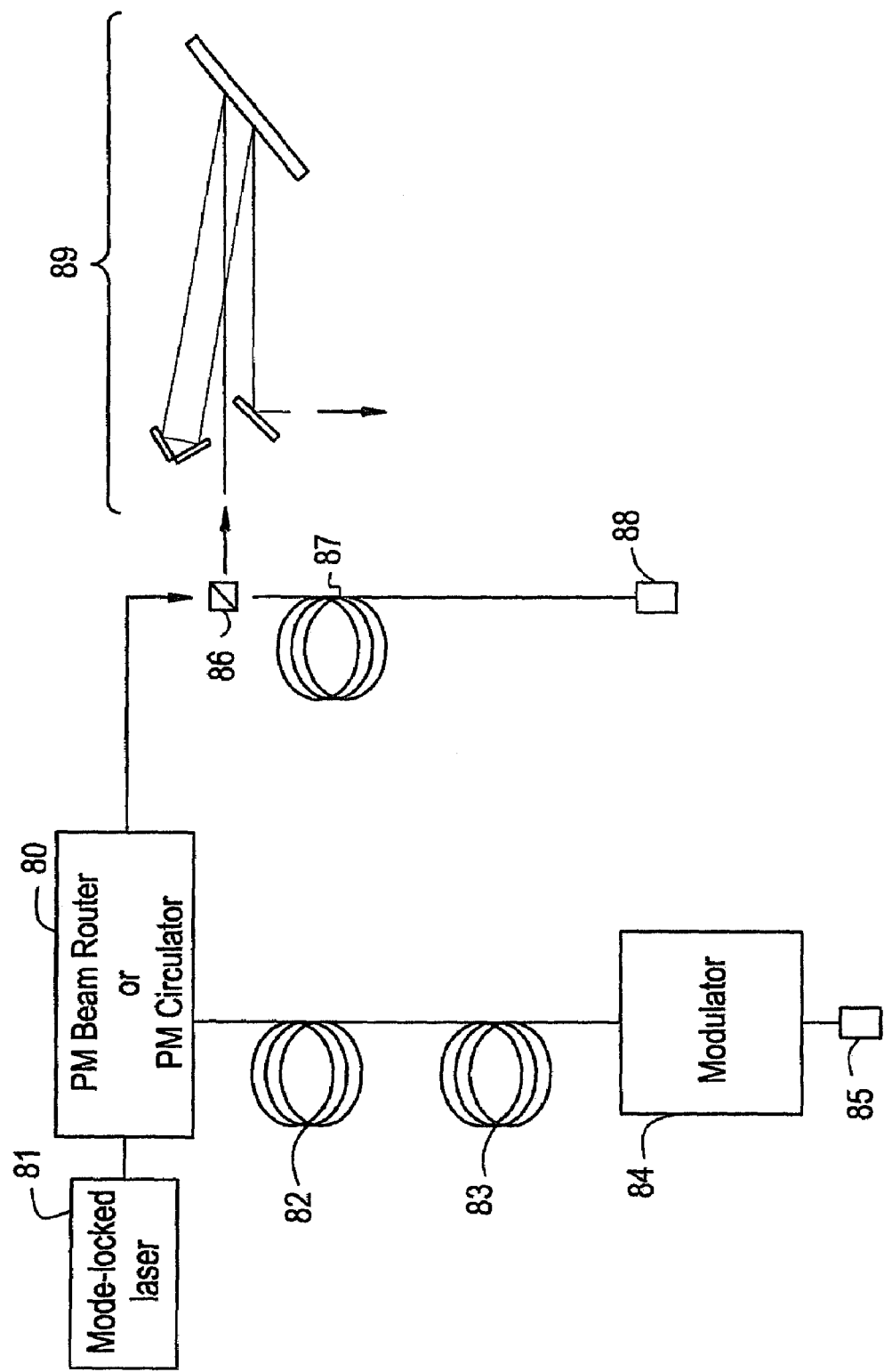
FIG. 7 illustrates a second chirped pulse amplification system using a polarization-maintaining beam router/circulator and a polarization-insensitive modulator, according to the present invention.
Figure 8:
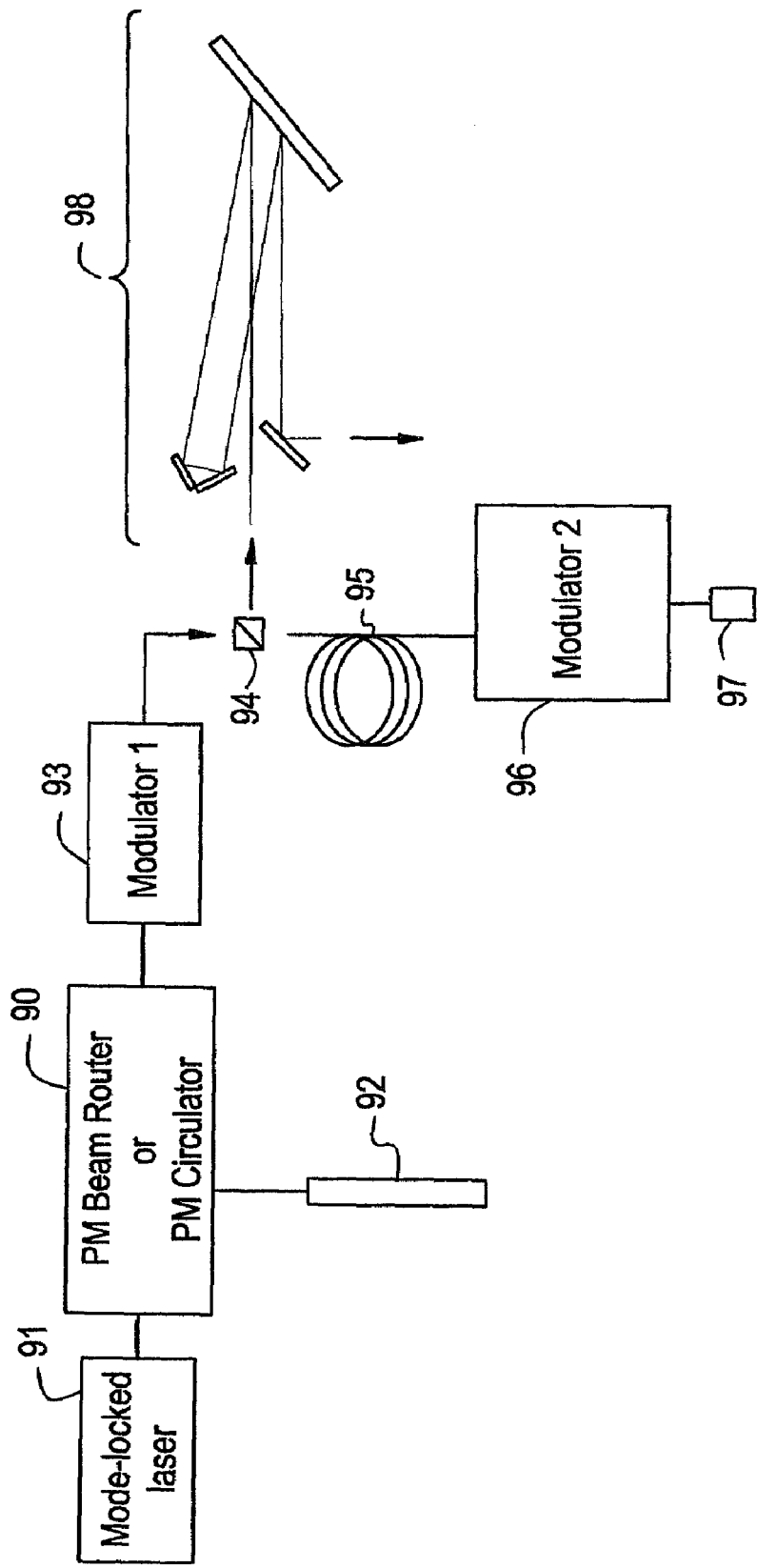
FIG. 8 illustrates a third chirped pulse amplification system using a polarization-maintaining beam router/circulator and two polarization-insensitive modulators, with one operating as a second pulse selector, according to the present invention.
Figure 9:
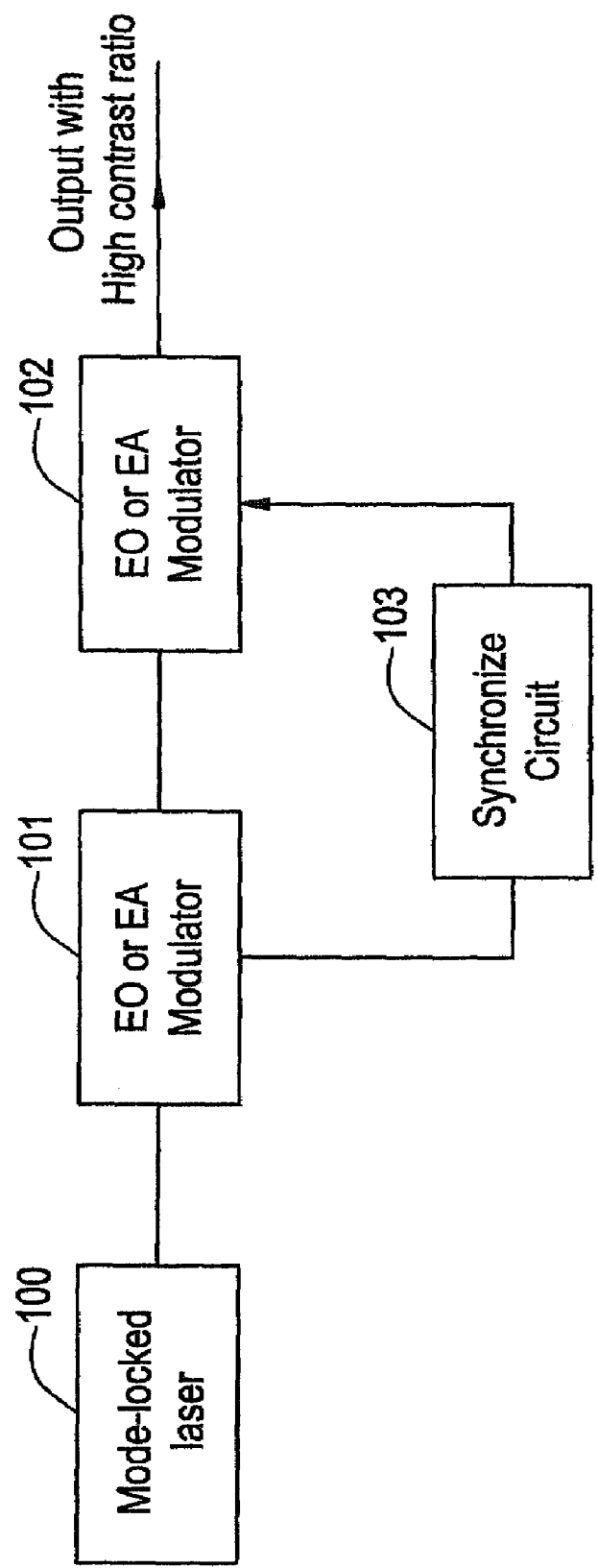
FIG. 9 illustrates cascaded modulators for improving contrast ratio.

Due to the polarization sensitive nature of the $LiNbO_3$ modulator, it can not be used in the same double pass loop with other non-polarizationmaintaining fiber components. However, the electro-absorption modulator has low power consumption, low drive voltage, small size, large electro-optic bandwidth, and most importantly, is polarization-insensitive. Therefore, an electro-absorption modulator can de disposed inside the double pass loop with other non-polarization-maintaining components, which can result in a more compact configuration. As shown in FIGS. 7 and 8, the modulator is either in the same loop of the stretcher and erbium doped fiber amplifier, or in the final power amplifier and used as the second pulse selector.

Referring to FIG. 7, a modulator can be added into the double pass loop in order to lower the cost and design a more compact system. Although this is not feasible for the $LiNbO_3$ modulator due to polarization limitations, another type of modulator can fulfill such function. An electro-absorption modulator is not polarization sensitive. Therefore, the electro-absorption modulator can be cascaded with a pulse stretcher and a pre-amplifier, such as an erbium doped fiber amplifier.

As illustrated in FIG. 7, a second chirped pulse amplification system according to the present invention is depicted. A polarization-maintaining beam router 80 is coupled to a single mode non-polarization-maintaining dispersion compensating fiber 82 operating as a pulse stretcher. A mode-locked laser 81 supplies input pulses to the polarization-maintaining beam router 80. A typical output pulse from the mode-locked laser 81 is a 50 megahertz, 300 femtosecond pulse, having a power of 0.1 nanojoule at 5 milliwatts. A pre-amplifier fiber 83 is coupled between the non-polarization-maintaining dispersion compensating fiber 82 acting as a pulse stretcher and an electro-absorption modulator 84. In general, the modulator can be spliced into any position in the double pass loop as long as the selected pulse can pass through the opened gate. Typically, the characteristics of the pulse at the pulse stretcher are 200-300 picoseconds, at 50 megahertz, 3 milliwatts and 0.06 nanojoules. A Faraday rotator mirror 85 is coupled to the electro-absorption modulator 84. The output of the polarization-maintaining beam router 80 is coupled to a beam splitter 86. In the present invention, output pulses from the polarization-maintaining beam router 80 are approximately 200-300 picoseconds, at 200 kilohertz and 10 nanojoules. A ytterbium/erbium erbium doped fiber amplifier 87 is coupled between the beam splitter 86 and a Faraday rotator mirror 88. Preferably, the ytterbium/erbium erbium doped fiber amplifier 87 is a multimode amplifier that is pumped to 4 Watts. The pulses output from the beam splitter 86 are generally 200-300 picoseconds in length at a 200 kilohertz repetition rate, and are 400 milliwatts and greater than 2 microjoule in strength. Prior to being output into the system, the amplified pulses are compressed back to femtosecond or picosecond range using an exemplary grating compressor 89.

Referring to FIG. 8, a third chirped pulse amplification system according to the present invention is depicted. A polarization-maintaining beam router 90 is coupled to a fiber grating 92 that is either linearly or nonlinearly chirped, and acting as a pulse stretcher. Typically, the characteristics of the pulse at the pulse stretcher are 200-300 picoseconds, at 50 megahertz, 3 milliwatts and 0.06 nanojoules. A mode-locked laser 91 supplies input pulses to the polarization-maintaining beam router 90. A typical output pulse from the mode-locked laser 81 is a 50 megahertz, 300 femtosecond pulse, having a power of 0.1 nanojoule at 5 milliwatts. The output of the polarization-maintaining beam router 90 is coupled to a first modulator 93 (electro-optic or electro-absorption) in order to down-count the repetition rate from the mode-locked laser 91. The output of the first modulator 93 is coupled to a beam splitter 94, and a ytterbium/erbium or erbium doped fiber amplifier 95 is coupled between the beam splitter 94 and a second modulator 96 (electro-absorption). In the present invention, output pulses from the first modulator 93 are approximately 200-300 picoseconds in length, at a 10 megahertz repetition rate, at 0.3 milliwatts and 0.03 nanojoules. The second modulator decreases the pulse repetition rate further and the selected pulses can pass through the second modulator 96 and are amplified in the ytterbium/erbium erbium doped fiber amplifier 95. Preferably, the ytterbium/erbium or erbium doped fiber amplifier 87 is a multimode amplifier that is pumped to 4 Watts. A Faraday rotator mirror 97 reflects and rotates the pulses that output from the second modulator 96. The pulses output from the beam splitter 94 are generally 200-300 picoseconds in length at a 400 kilohertz repetition rate, and are 400 milliwatts and greater than 1 microjoule in strength. Prior to being output into the system, the amplified pulses are compressed back to femtosecond or picosecond range using an exemplary grating compressor 98.

As shown in FIG. 8, the selected pulses can be amplified using a double pass side-pumping scheme. In addition, an end-pumping configuration can also be used to amplify the selected pulses, and usually it gives a higher output power and higher pulse energy due to the availability of the high-power multimode pump diodes. Due to the nonlinearity, the amplifier fiber used in the final amplifier has to be multimode fiber. The larger the core size, the less severe the nonlinear effect, but the more difficult to control the single mode operation. In U.S. Pat. No. 5,818,630 issued to Fermann et al, a mode filter and/or mode-converter was used to control single mode operation in such a multimode system. In the present invention, however, by carefully aligning the amplifier fiber relative to the seed and the pump, single mode operation can be achieved in double clad multimode fiber without any mode filter or mode converter, with fiber core size up to 20 micrometers. When fiber core size is larger than 25 micrometers, single mode operation can still be achieved, but it is difficult to maintain the single mode, especially when touching or moving the fiber.

Usually, poor contrast ratio is expected from an electro-optic modulator or an electro-absorption modulator (<23 decibels). But for a chirped pulse amplification system, a contrast ratio of 30 decibels or above is normally required, especially in the case of 100:1 (or higher) pulse selection. In order to achieve the required contrast ratio, a second modulator is cascaded and synchronized with a first modulator. With one electro-absorption modulator in a double pass configuration, or, two electro-optic modulators or electro-absorption modulators in cascaded sequence and with synchronizing electronics, the contrast ratio can be doubled. In addition, adding a second erbium doped fiber amplifier between the pulse selector and the power amplifier easily boosts the contrast ratio to at least 30 decibels.

Referring to FIG. 4 a pulse stream from a mode-locked laser 100 is input into a first modulator 101. The first modulator 101 can be an electro-optic modulator or an electro-absorption modulator. The first modulator 101 is coupled to a second modulator 102, which also can be an electro-optic modulator or an electro-absorption modulator. A synchronizer circuit 103 synchronizes the first modulator 101 with the second modulator 102. In operation, the selected pulse from the first modulator 101 can pass through the second modulator 102 with negligible loss. A rejected pulse from the first modulator 101 will incur a high loss at the second modulator 102, so the contrast ratio can be doubled after the second modulator 102. Another solution to this is to add a second erbium doped fiber amplifier (or a ytterbium/erbium or erbium doped fiber amplifier) between the modulator and the final amplifier. A 30 decibel contrast ratio is readily achievable from this approach.

Figure 10B:
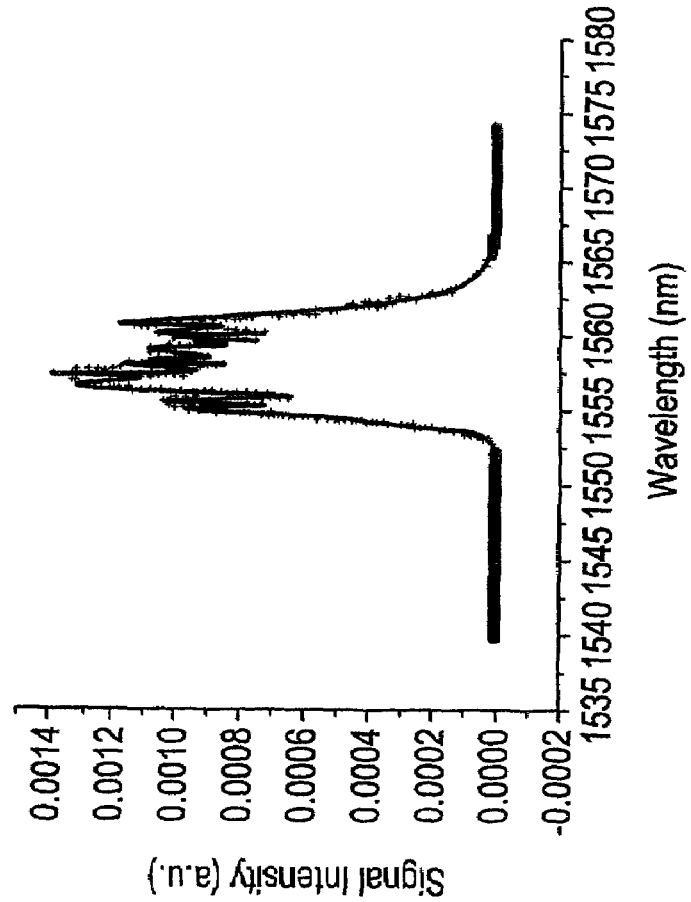
FIG. 10 shows the spectrum and pulse profile after the pulse compressor in a system described in FIG. 6.
Figure 10A:
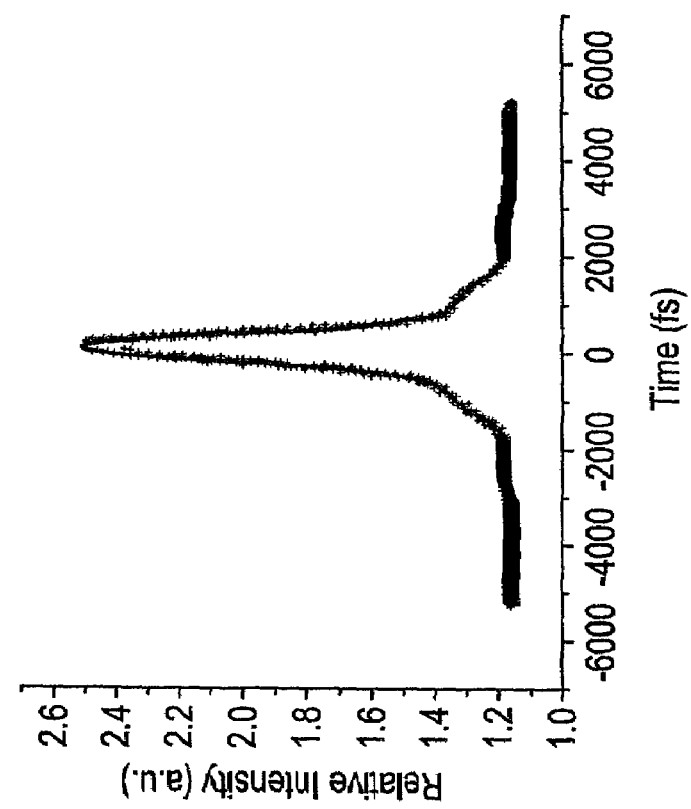

By using commercially available modulators (LiNbO$_3$ modulator), the present invention can down count a 50 megahertz, 300 femtosecond pulse from an IMRA Femtolite laser to as low as 100 kilohertz, and obtain over 1.2 Watts output from a double clad ytterbium/erbium erbium doped fiber amplifier at 19 Watt pump. At 200 kilohertz repetition rate, the present invention can obtain 2 microjoules and 820 femtoseconds after compression. The spectrum and pulse profiles are shown in FIG. 10.

The foregoing description of the preferred embodiments of the invention has been presented for purposes of illustration and description. Similar can be obtained at other wavelength such as 1.06 μm for a Yb-doped fiber system. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

Thus, while only certain embodiments of the invention have been specifically described herein, it will be apparent that numerous modifications may be made thereto without departing from the spirit and scope of the invention. The invention thus includes a number of aspects which may be generally characterized as follows:

In one broad aspect, the invention may be characterized as a chirped pulse amplifier for a fiber optic system, including a mode-locked laser and a pulse selector coupled to an output of the mode-locked laser, wherein the pulse selector modulates an output stream of pulses based upon an applied modulation voltage. Herein, the pulse selector may be an electro-optic modulator, which may be a LiNbO$_3$ modulator, or an electro-absorption modulator.

According to another aspect of the invention, the invention can be characterized as a chirped pulse amplifier for a fiber optic system, including a mode-locked laser, a polarization-maintaining device coupled to an output of the mode-locked laser, a pulse stretcher coupled to a first output of the polarization-maintaining device, an amplifier coupled to the pulse stretcher, and a first pulse selector coupled to a second output of the polarization-maintaining device, Herein, the pulse stretcher may include one of: (1) a non-polarization-maintaining dispersion compensating fiber and a Faraday rotator mirror; (2) a non-polarization-maintaining dispersion shifted fiber and a Faraday rotator mirror; (3) a linearly chirped fiber grating and a Faraday rotator; or (4) a non-linearly chirped fiber grating and a Faraday rotator, or like devices.

Further herein, the amplifier may include an erbium doped fiber amplifier or a erbium/ytterbium or a ytterbium doped fiber amplifier; a wavelength division multiplexer; and a diode pump.

Further herein, the first pulse selector may again be an electro-optic modulator or an electro-absorption modulator.

Further herein, the polarization-maintaining device comprises a polarization-maintaining beam router, wherein a fiber axis orientation of the input and output fibers matches the orientation of the polarization beam splitter. In addition, a Faraday rotator may be disposed at a first port of the polarization-maintaining beam router and a Faraday rotator mirror at that port of the polarization-maintaining beam router in case the optical device is transmissive.

This aspect of the invention may further include a second pulse selector coupled to an output of the first pulse selector; and a synchronization controller that synchronizes the first pulse selector with the second pulse selector. The second pulse selector is again an electro-optic modulator or an electro-absorption modulator.

According to a further aspect, the invention may be characterized as a chirped pulse amplifier for a fiber optic system operating at approximately 1550 nanometers or other wavelength, the amplifier including a mode-locked laser; a polarization-maintaining device coupled to an output of the mode-locked laser; a pulse stretcher coupled to a first output of the polarization-maintaining device; a first amplifier coupled to the pulse stretcher; a pulse selector coupled to the first amplifier; and a second amplifier coupled through a beam splitter to a second output of the polarization-maintaining device. Herein, the pulse stretcher may be embodied variously, including (1) a polarization-maintaining dispersion compensating fiber and a Faraday rotator mirror, wherein the pulse selector is coupled between the first amplifier and the Faraday rotator minor; (2) a polarization-maintaining dispersion shifted fiber and a Faraday rotator minor, wherein the pulse selector is coupled between the first amplifier and the Faraday rotator minor; (3) a linearly chirped polarization-maintaining fiber grating and a Faraday rotator, wherein the pulse selector is coupled between the first amplifier and the Faraday rotator; or (4) a non-linearly chirped polarization-maintaining fiber grating and a Faraday rotator, wherein the pulse selector is coupled between the first amplifier and the Faraday rotator.

Further herein, the first amplifier may be an erbium doped fiber amplifier or a erbium/ytterbium doped fiber amplifier or a ytterbium doped fiber amplifier; a wavelength division multiplexer; and a diode pump. The pulse selector again may be an electro-optic modulator or an electro-absorption modulator.

Further herein, the polarization-maintaining device can be a polarization-maintaining beam router, wherein a fiber axis orientation of the input and output fibers matches the orientation of the polarization beam splitter, and may include a Faraday rotator disposed at a first port of the polarization-maintaining beam router and a Faraday rotator mirror at that port of the polarization-maintaining beam router in case the optical device is transmissive.

Further herein, the second amplifier can be a double clad multimode amplifier fiber operating as a Single mode amplifier. In such a case, the multimode amplifier fiber core may be less than or equal to 20 micrometers in diameter.

According to a yet further aspect of the invention, the invention can be characterized as a chirped pulse amplifier for a fiber optic system, including a mode-locked laser, a polarization-maintaining device coupled to an output of the mode-locked laser, a pulse stretcher coupled to a first output of the polarization-maintaining device, a first pulse selector coupled to a second output of the polarization-maintaining device, a second amplifier coupled through a beam router to an output of the first pulse selector; and a second pulse selector coupled to the second amplifier.

Herein, the pulse stretcher can be a linearly chirped fiber grating and a Faraday rotator; or a non-linearly chirped fiber grating and a Faraday rotator, among various examples. The first pulse selector can again be an electro-optic modulator or an electro-absorption modulator. Further herein, the polarization-maintaining device can again include a polarization-maintaining beam router, wherein a fiber axis orientation of the input and output fibers matches the orientation of the polarization beam splitter, together with a Faraday rotator disposed at a first port of the polarization-maintaining beam router; and a Faraday rotator mirror at that port of the polarization-maintaining beam router in case the optical device is transmissive.

Further according to this aspect, the second amplifier can be double clad multimode amplifier fiber operating as a single mode amplifier, in which case the double clad multimode amplifier fiber core is less than or equal to 20 micrometers in diameter.

Any acronyms that are used merely to enhance the readability of the specification and claims. It should be noted that these acronyms are not intended to lessen the generality of the terms used and they should not be construed to restrict the scope of the claims to the embodiments described therein.

What is claimed is:

1. A chirped pulse amplification system, comprising:
   a mode-locked laser;
   a polarization-maintaining device coupled to an output of the mode-locked laser;
   a pulse stretcher coupled to a first output of the polarization-maintaining device;
   a first pulse selector comprising an integrated modulator, the first pulse selector being coupled to a second output of the polarization-maintaining device, said pulse selector being disposed downstream of said pulse stretcher and configured to receive stretched pulses;
   a fiber amplifier coupled to an output of the first pulse selector; and
   a second pulse selector comprising an integrated modulator, the second pulse selector being coupled to the fiber amplifier, wherein at least one of an input and output of each of the first and second pulse selectors is fiber coupled.

2. The chirped pulse amplification system according to claim 1, wherein the pulse stretcher comprises:
   a linearly chirped fiber grating; and
   a Faraday rotator.

3. The chirped pulse amplification system according to claim 1, wherein the pulse stretcher comprises:
   a non-linearly chirped fiber grating; and a Faraday rotator.

4. The chirped pulse amplification system according to claim 1, wherein the first pulse selector comprises an electra-optic modulator or an electro-absorption modulator.

5. The chirped pulse amplification system according to claim 1, wherein the polarization-maintaining device comprises a polarization-maintaining beam router, wherein a fiber axis orientation of the input and output fibers matches the orientation of the polarization beam splitter.

6. The chirped pulse amplification system according to claim 1, wherein the polarization-maintaining device comprises:

a polarization-maintaining beam router, wherein a fiber axis orientation of the input and output fibers matches the orientation of the polarization beam splitter;

a Faraday rotator disposed at a first port of the polarization-maintaining beam router; and a Faraday rotator mirror at that port of the polarization-maintaining beam router in case the optical device is transmissive.

7. The chirped pulse amplification system according to claim 1, wherein the fiber amplifier comprises double clad multimode amplifier fiber operating as a single mode amplifier.

8. The chirped pulse amplification system according to claim 1, wherein the fiber amplifier comprises double clad multimode amplifier fiber operating as a single mode amplifier, wherein the double clad multimode amplifier fiber core is less than or equal to 20 micrometers in diameter.

9. The chirped pulse amplification system of claim 1, wherein an increase in pulse width produced with the stretcher sufficiently reduces the peak intensity of a pulse such that non-linear effects within the first and second pulse selectors and corresponding integrated modulators are substantially avoided.

10. The chirped pulse amplification system according to claim 1, wherein the second pulse selector comprises an integrated electro-absorption modulator.

11. The chirped pulse amplification system according to claim 1, wherein the chirped pulse amplification system comprises an operating wavelength at about 1550 nanometers or 1060 nanometers.

12. The chirped pulse amplification system according to claim 1, wherein one or both of the first and second pulse selectors comprise cascaded integrated and synchronized modulators, the modulators providing a contrast ratio of at least 30 dB.

13. The chirped pulse amplification system according to claim 1, wherein the fiber amplifier comprises a erbium doped or ytterbium/erbium doped gain fiber.

* * * * *